United States Patent [19]
Burmeister et al.

[11] 4,319,803
[45] Mar. 16, 1982

[54] OPTICAL FIBER COATING

[75] Inventors: Robert A. Burmeister, Saratoga; Paul E. Greene, Los Altos; Ronald Hiskes, Palo Alto, all of Calif.

[73] Assignee: Hewlett-Packard Company, Palo Alto, Calif.

[21] Appl. No.: 963,253

[22] Filed: Nov. 24, 1978

[51] Int. Cl.³ .............................................. G02B 5/172
[52] U.S. Cl. .............................. 350/96.33; 350/96.34; 427/163; 427/167
[58] Field of Search ............... 350/96.30, 96.33, 96.34; 65/3 R, 3 A, 3 B, 3 C; 427/162, 163, 164, 165, 166, 167

[56] References Cited

U.S. PATENT DOCUMENTS

| | | | |
|---|---|---|---|
| T958,010 | 5/1977 | Eichenbaum et al. | 350/96.34 |
| 3,485,666 | 12/1969 | Sterling et al. | 427/162 UX |
| 3,549,411 | 12/1970 | Bean et al. | 65/3 A X |
| 3,999,835 | 12/1976 | Newns et al. | 350/96.34 X |
| 4,028,080 | 6/1977 | Di Vita et al. | 65/2 |
| 4,118,211 | 10/1978 | Au Coin et al. | 65/3 R |

FOREIGN PATENT DOCUMENTS 2818036  11/1978  Fed. Rep. of Germany ....... 65/3 A

OTHER PUBLICATIONS

Helix et al., "Properties of Be-Implanted Planar GaAs p-n Junctions", *IEEE J. Solid-State Cir.*, vol. SC-13, No. 4, Aug. 1978, pp. 426-429.

Duffy et al., "Preparation, Properties, and Applications of . . . Silicon Nitride Films", *RCA Review*, Dec. 1970, pp. 742-753.

*Primary Examiner*—John D. Lee
*Attorney, Agent, or Firm*—John A. Frazzini

[57] ABSTRACT

An optical fiber is coated with an inorganic non-metallic coating to form a thin seal. The coating is preferably applied on-line by a process such as chemical vapor deposition.

8 Claims, 1 Drawing Figure

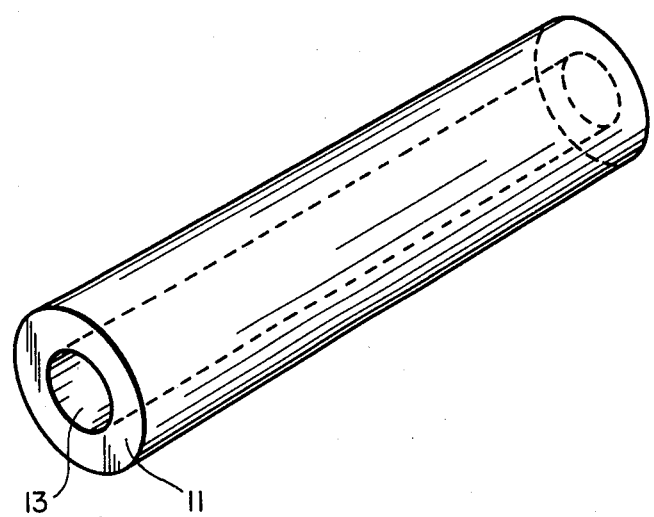
FIG_1

OPTICAL FIBER COATING

BACKGROUND OF THE INVENTION

This invention relates to optical fibers and in particular to a method for protecting a fiber surface by applying a seal. It is well known that bare uncoated fibers are susceptible to abrasion and corrosion. Various chemicals, including water, can react with a fiber damaging its optical properties and weakening its mechanical strength and static fatigue resistance. Microcracks in a fiber surface present regions susceptible to chemical attack, especially when the fiber is under stress. Fiber stress tends to open a crack, thereby focusing the strain onto the chemical bonds at the tip of the crack. These strained bonds are more easily broken thereby enabling corrosion to extend such microcracks. Growth of microcracks weakens the strength of a fiber producing static fatigue or sudden failure.

There presently exist a variety of coatings which protect a fiber from abrasion but not from corrosion. Because such coatings do not protect a fiber from corrosion, many prior art methods attempt to reduce microcrack degradation by employing expensive techniques to reduce the number of microcracks. Additionally, the use of fibers is often restricted to low stress applications. Another approach is to apply a metallic coating to a fiber to prevent water from reaching the fiber. It has been suggested to apply a metal seal of molten tin or aluminum which form a hermetic coating when cooled. However, metals tend to form polycrystalline solids which can themselves be rapidly corroded via greatly enhanced grain boundary diffusion. The relatively open structure of the grain boundaries provide an easy path for migrating ions to reach the $SiO_2$ surface and nucleate and/or propagate cracks. Metal coats also provide an often undesirable electrical path along a fiber. In addition, many metals react with $SiO_2$ to form metal oxides. There abrasive particles of metal oxides may roughen the $SiO_2$ surface and act as stress raisers to provide easy nucleation sites for potential cracks.

Other inorganic materials, including silicon nitride, have been used in semiconductor technology for insulating, passivating and sealing devices and integrated circuits. (See, for example, M. T. Duffy et al., *Preparation, Properties, and Applications of Chemically Vapor Deposited Silicon Nitride Films*, RCA Review, December 1970, pages 742-753.) However, these coatings have not been applied to optical fibers, in which the coating must be applied on-line at high speed in a continuous process. It should be noted that optical fibers are subjected to abrasion, bending and tensile strain not encountered by semiconductor substrates. For a fiber coating to be operational, it must therefore display properties (e.g., adhesion, fracture strength, microstructure, particle size, surface morphology), which are not required for semi-flat semiconductor coatings. In addition, the optical absorption of silicon nitride is higher than that of $SiO_2$ which provides an advantageous characteristic of reducing optical crosstalk unique to optical fiber technology in certain configurations of multiple fiber bundles.

SUMMARY OF THE INVENTION

In accordance with the illustrated preferred embodiment, the present invention provides an optical fiber sealed with an inorganic, non-metallic coating composed, for example, of a compound of silicon and nitrogen or silicon, nitrogen and oxygen. The fiber can be coated on-line by methods such as chemical vapor deposition.

DESCRIPTION OF THE DRAWING

FIG. 1 shows an optical fiber including a coating according to the invention.

DETAILED DESCRIPTION OF THE INVENTION

Several coatings have been found which can be applied in thickness ranging from a few Angstroms to greater than 1000 Angstroms to optical fibers to inhibit the fatigue of the fiber. A coating composed of silicon and nitrogen or silicon, nitrogen and oxygen can be applied on-line by chemical vapor deposition in a device as shown in copending patent application Ser. No. 963,242 entitled "Fiber Coating Method Employing a Chemical Reactor for Applying an On-Line Coating at High Speed" filed even date herewith by Burmeister et al., and assigned to the present assignee. In one such process, the coating is deposited by reacting silane with ammonia. The ratio of nitrogen to silicon is controlled by varying the partial pressures. A nitrogen carrier gas is supplied to aid in forming a uniform coat. In general, the amounts of nitrogen and ammonia must be much greater than the amount of silane to avoid forming dust particles which could then be incorporated in the coat.

Referring to FIG. 1, an approximately 300 Å thick coat 11 composed of silicon and nitrogen can be deposited on a 140 μm diameter silica fiber 13 by pulling the fiber at 0.25 m/s through a furnace held at 1000° C. with reactant gas flow rates held at 25 cc/min. for silane, 3200 cc/min. for ammonia, 1400 cc/min. for nitrogen gas. Such coatings have also been applied using reactant gas partial pressure in the ranges: 1-95 torr for silane, 10-680 torr for ammonia, and 77-727 torr for nitrogen. Silicon nitride or silicon oxynitride can be applied as an amorphous coat by employing a furnace temperature in the range 200-1400° C. For example, a 200 Å thick coat composed of silicon, nitrogen and oxygen can be deposited on a 140 μm diameter fiber by pulling the fiber at 0.32 m/s through a furnace held at 900° C. with reactant gas flow rates held at 50 cc/min. for silane, 2600 cc/min. for ammonia, and 1200 cc/min. for nitrogen. In contrast, a metal coating will be polycrystalline unless subjected to an extremely rapid cooling method, such as splat cooling, which is incompatible with a fiber coating process. An amorphus coat has the advantage of being less subject to fracture, corrosion, and breakdown of electrical isolation than a crystalline or polycrystalline coat. Oxygen can also be added as a reactant to vary the coatings' properties. By varying partial pressures, the coating can be varied from $Si_3N_4$ to $SiO_2$. Additionally, amorphous boron, silicon, boron nitride or alloys of silicon nitride and boron nitrides may be suitable. The carrier gas need not be nitrogen, and could include argon, helium, and hydrogen. Fibers coated with silicon nitride and silicon oxynitride within the range of experimental conditions described above exhibit strain rate parameters n in the range of 40-50 in contrast to values of n in the range 20-25 for $SiO_2$ fibers without the silicon nitride or silicon oxynitride coatings which are strain rate tested at the same temperature and relative humidity.

We claim:

1. A method for hermetically sealing an optical fiber by applying a coat consisting essentially of silicon, nitrogen and oxygen.

2. A method as recited in claim 1 wherein the coat is applied by chemical vapor deposition.

3. A method as recited in claim 2 wherein the reaction temperature is selected to lie in the range 200° C. to 1400° C.

4. A method for hermetically sealing an optical fiber by applying a coat consisting essentially of boron, nitrogen and oxygen.

5. A method as recited in claim 4 wherein the coat is applied by chemical vapor deposition.

6. A method as recited in claim 5 wherein the reaction temperature is selected to lie in the range 200° C. to 1400° C.

7. An optical fiber coated with a hermetic material consisting essentially of silicon, nitrogen and oxygen.

8. An optical fiber coated with a hermetic material consisting essentially of boron, nitrogen, and oxygen.

* * * * *